INVENTORS
Kenneth R. Johnson
Carl J. Beert
Edwin N. Brogren
by Wolfe, Hubbard, Voit & Osann
ATTORNEYS Nov. 12, 1968   K. R. JOHNSON ETAL   3,410,052
MACHINE FOR HANDLING ARTICLES AND CONTAINERS
Filed Feb. 17, 1966   8 Sheets-Sheet 7

INVENTORS
Kenneth R. Johnson
Carl J. Beert
Edwin N. Brogren
by Wolfe, Hubbard, Voit & Osann
ATTORNEYS United States Patent Office
3,410,052
Patented Nov. 12, 1968

3,410,052
MACHINE FOR HANDLING ARTICLES
AND CONTAINERS
Kenneth R. Johnson, Carl J. Beert, and Edwin N. Brogren, Rockford, Ill., assignors to Bartelt Engineering Company, Inc., Rockford, Ill., a corporation of Delaware
Filed Feb. 17, 1966, Ser. No. 528,310
9 Claims. (Cl. 53—249)

ABSTRACT OF THE DISCLOSURE

Stacks of packages advanced along a horizontal path by a conveyor are shoved horizontally off of the conveyor by a pusher, are loaded into empty cartons supported in a holder with their open ends facing the conveyor, and the loaded cartons are swung downwardly with the holder and placed open-end up on a second conveyor spaced laterally and downwardly from the first conveyor. The holder then is swung upwardly to an intermediate position between the two conveyors, is loaded with a new supply of empty cartons, and is swung upwardly alongside the first conveyor so that additional stacks of packages may be loaded into the cartons. The second conveyor comprises an endless belt formed with a series of pockets which receive prongs on the holder as the latter is lowered to enable placement of the loaded cartons on flat sections of the belt between the pockets and thereby effect automatic removal of the cartons from the holder.

---

This invention relates to a machine for handling articles and containers and, more particularly, to a machine for inserting articles such as stacks of packages into containers such as display cartons, and for transferring the filled cartons to a terminal station for packing into shipping boxes and eventual shipment. In such a machine, the stacks of packages are advanced by a carrier to a discharge station and are shifted from the discharge station into the cartons by a loading mechanism which reciprocates back and forth across the carrier.

The general object of the present invention is to provide a new and improved machine of the above character for presenting the empty cartons alongside the discharge station for filling, filling the cartons, and thereafter arranging the filled cartons for advancement to the terminal station in a rapid and automatic operation with relatively few and comparatively simple operating elements.

A more detailed object is to provide in a machine of the above type a novel transfer mechanism having a carton holder which receives empty cartons at a point spaced laterally from the article carrier, carries the empty cartons toward the carrier to a position alongside the discharge station and, after the cartons have been filled, shifts the filled cartons away from the discharge station and deposits the cartons in a novel manner on an endless conveyor for advancement to the terminal station.

Another object is to provide a novel holder for supporting cartons as they are loaded and then depositing the loaded cartons on an upwardly facing conveyor automatically as an incident to movement of the holder downwardly toward the conveyor.

A related object is to employ the carton holder in conjunction with a continuous motion endless conveyor having at least one upwardly opening pocket into which the holder enters to deposit the filled cartons automatically on the conveyor.

Still another object is to provide a new and improved loading mechanism having series of spaced pushers movable in unison across the path of the carrier to insert a series of packages simultaneously into a series of cartons when the latter are positioned alongside the discharge station.

Other objects and advantages of the invention will become apparent from the following detailed description taken in connection with the accompanying drawings, in which:

Figure 6:
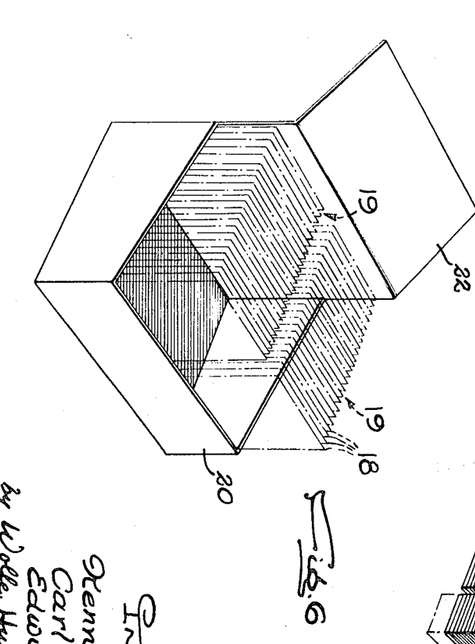
FIG. 6 is a perspective view of a carton filled with packages, the packages being shown in broken lines.

As shown in the drawing for purposes of illustration, the invention is embodied in a machine for collecting small stacks 17 of packages 18 in larger stacks 19, loading the larger stacks into display cartons 20, and transferring the loaded cartons to a discharge conveyor 21. Herein, the packages are envelope-type pouches which are filled with a measured charge of product and sealed closed by a high speed automatic packaging machine. The cartons are of the type having open tops, partially open front sides and upwardly projecting display flaps 22 (FIGS. 3 and 6), and each is adapted to hold two large stacks of pouches side-by-side in an upright position so that the pouches are clearly visible and readily accessible when the cartons are placed on display shelves.

As the pouches 18 are delivered from the filling and closing units of the packaging machine, they first are arranged in the small stacks 17 of four pouches each (FIGS. 2 to 5) on a delivery conveyor (not shown). Then, at an initial station 24 of a cartoning conveyor 25 (FIG. 7) the small stacks are grouped into the larger stacks 19, herein of twenty-four pouches each, in receivers 26 on the cartoning conveyor and are advanced intermittently to a discharge station 27 spaced along the path of the conveyor from the initial station. A mechanism suitable for accumulating the small stacks into the large stacks is shown in Frank Patent No. 3,107,793 to which reference may be had for details of construction and operation.

Figure 7:
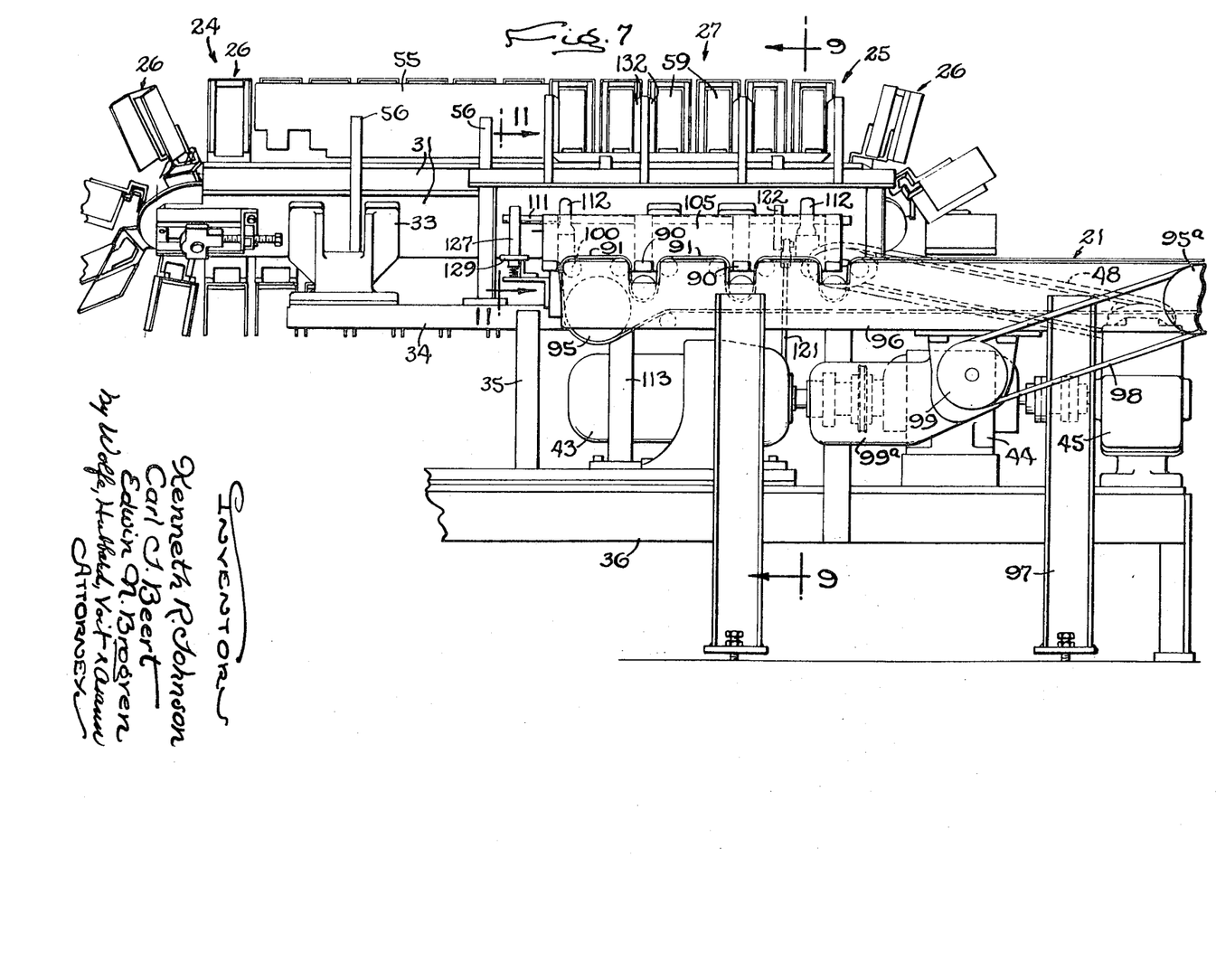
FIG. 7 is a fragmentary side elevation of a cartoning machine embodying the novel features of the present invention.
Figure 8:
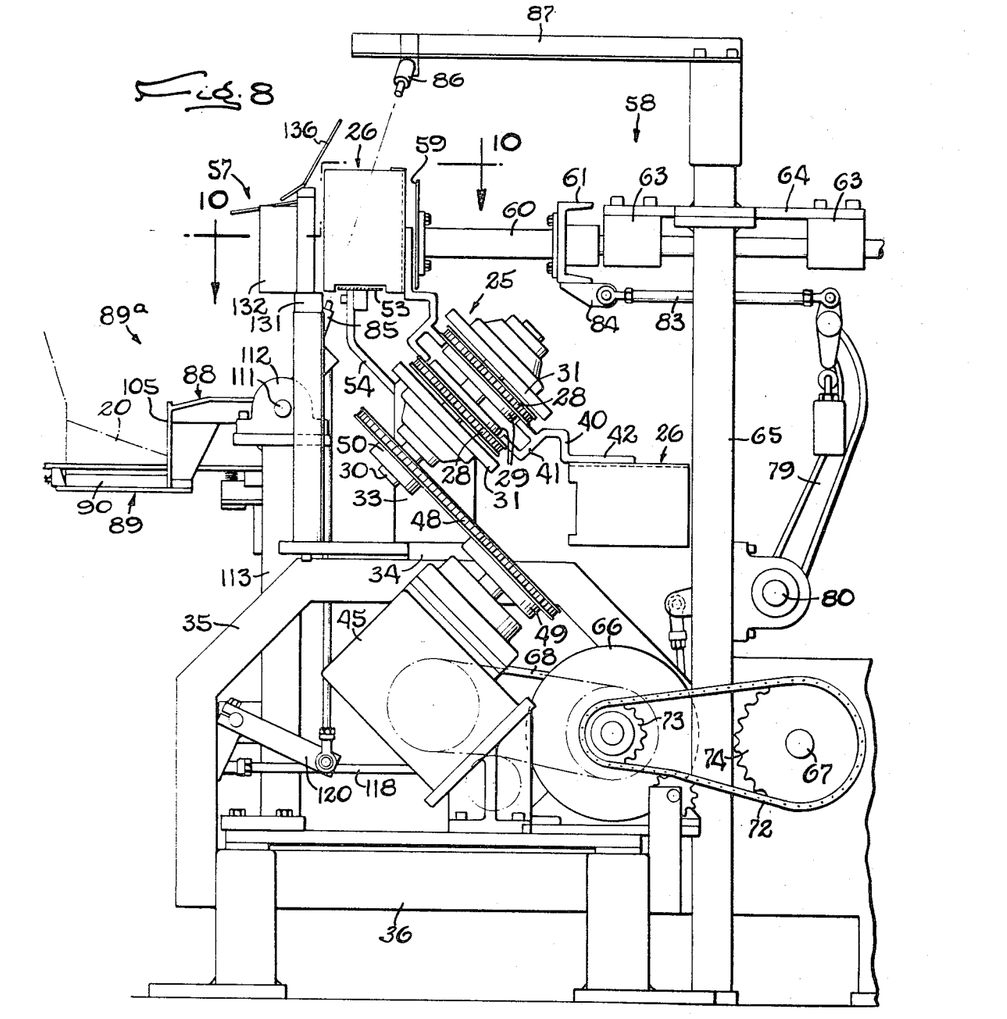
FIG. 8 is an enlarged fragmentary end view of the machine shown in FIG. 7.
Figure 9:
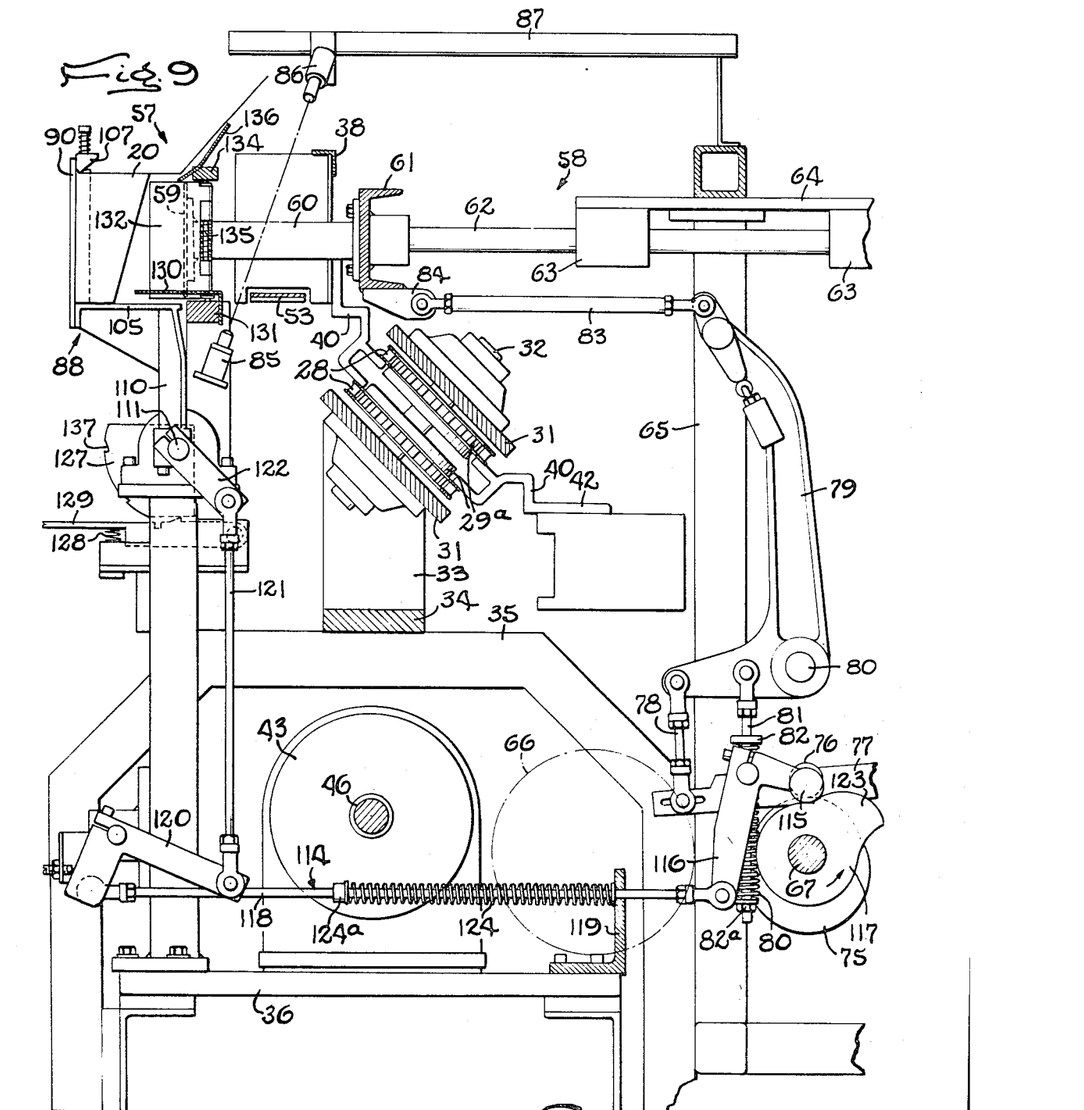
FIG. 9 is an enlarged fragmentary cross-section taken substantially along the line 9—9 of FIG. 7 and showing the parts in moved positions.

The cartoning conveyor 25 is shown most clearly in FIGS. 7 to 9, and includes a pair of spaced endless chains 28 running parallel to each other in planes which are inclined at an angle of about 45 degrees from the vertical. The chains are trained around similarly inclined sprocket wheels 29 keyed to a shaft 30 journalled to turn in bearings fastened to upper and lower parallel rails 31 near the left-hand ends of the latter. A similar shaft 32 and sprocket wheels 29a support the chains near the opposite ends of the rails. The lower rail is supported on standards 33 fastened to a long horizontal plate 34 which, in turn, is fastened to upright posts 35 projecting upwardly from a generally rectangular base 36. Suitable ties (not shown) extending between the lower and upper rails hold the upper rail in position above the base.

Figures 13, 14, 15:
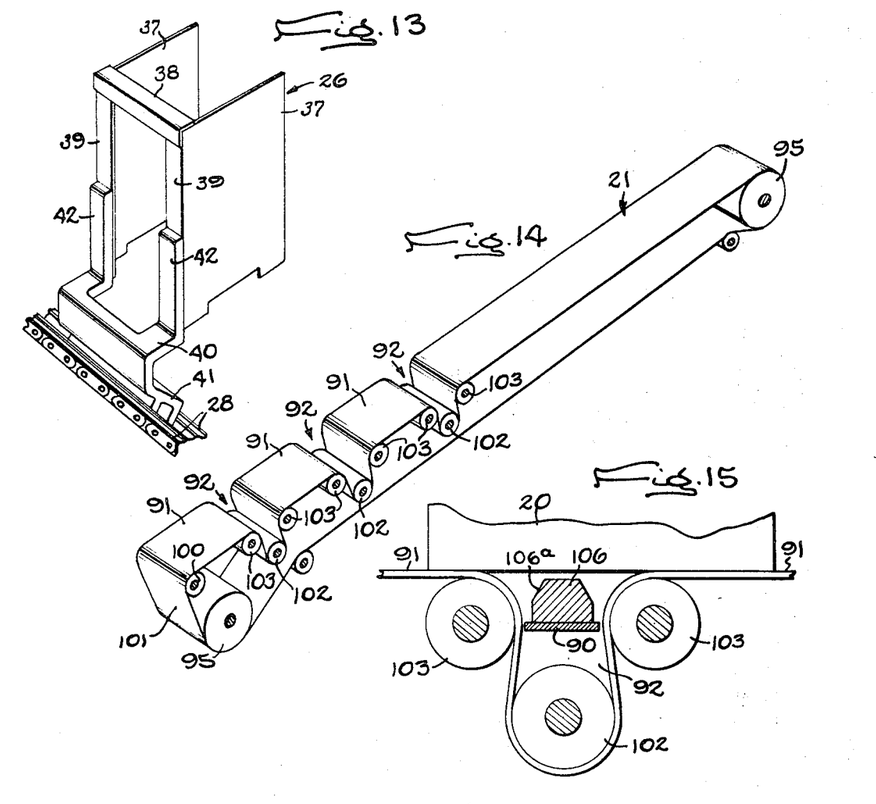
FIG. 13 is an enlarged fragmentary perspective view of parts of the carrier for advancing the articles.
FIG. 14 is a fragmentary perspective view of the endless conveyor.
FIG. 15 is an enlarged fragmentary side elevation of a portion of the endless conveyor shown in relation to the carton holder and a carton during the transfer of the carton to the conveyor.

Herein, the receivers 26 comprise buckets formed by opposed parallel side walls 37 (FIG. 13) joined across the top by an angle bar 38. The upper and lower ends and the forward side of the buckets are left open, and the rear side is partially closed by flanges 39 turned toward each other from the free edge of each side wall. To mount the buckets on the chains 28, a bracket 40 is formed at one end with a yoke 41 and at the other end with a pair of legs 42 which are welded or otherwise rigidly secured to the flanges of the buckets. The yokes are offset from the legs at a 45-degree angle and are fastened to the opposed sides of the chains at evenly spaced points. Mounted on the inclined chains with brackets of this type, the buckets are disposed vertically when they are on the upper run of the conveyor and then assume a horizontal position as they are carried along the lower run. With this arrangement, the vertical space required to accommodate the conveyor is reduced considerably when compared to that required for a conveyor of similar size disposed in a vertical plane, and, as a consequence, various driving elements for the machine may be mounted beneath the conveyor without materially increasing the overall height of the machine.

Figure 16:
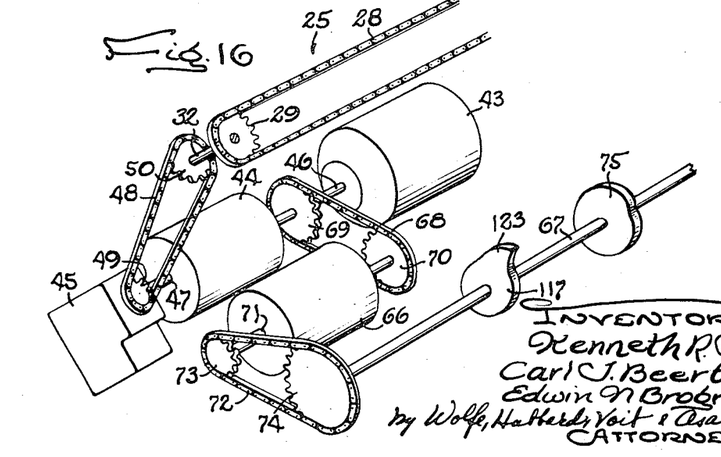
FIG. 16 is a schematic perspective view illustrating the drive for the various mechanisms.

To advance the loaded buckets 26 intermittently from the initial station 24 to the discharge station 27, an electric motor 43, acting through an electro-magnetic clutch unit 44, drives a gearbox 45 which is connected to the conveyor 25. As shown in FIGS. 7, 8 and 16, the clutch unit is positioned on the base 36 and rotatively couples the output shaft 46 of the motor to the input shaft 47 of the gearbox, the motor and the gearbox also being supported on the base. A chain 48 trained around sprockets 49 and 50 on the output shaft of the gearbox and on the conveyor shaft 32 completes the drive train. After each bucket dwelling in the initial station has been filled with a large stack 19 of pouches 18, the clutch unit is energized momentarily to advance the loaded bucket one step (in the direction of the arrow 52 shown in FIG. 2) toward the discharge station. As they move between the two stations, the pouches ride along a platform 53 (FIGS. 8 and 9) which prevents the pouches from falling out of the open lower ends of the buckets. The platform extends along the length of the conveyor beneath the buckets and is supported by arms 54 secured to the conveyor rails 31. A vertical retaining plate 55 (FIG. 7) extends along the forward side of the conveyor between the stations and prevents the pouches from falling out of the forward sides of the buckets, the retaining plate being fastened to posts 56 projecting upwardly from the plate 34.

Figure 3:
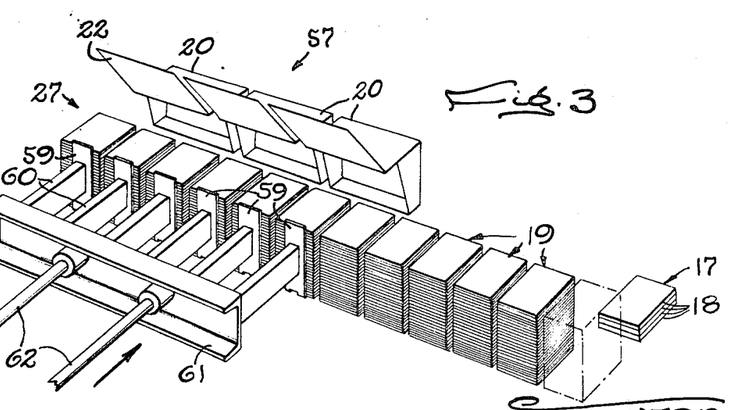
FIG. 3 is a view similar to FIG. 2 showing the arrangement of the packages and the loading mechanism just prior to insertion of the packages into the cartons.
Figure 4:
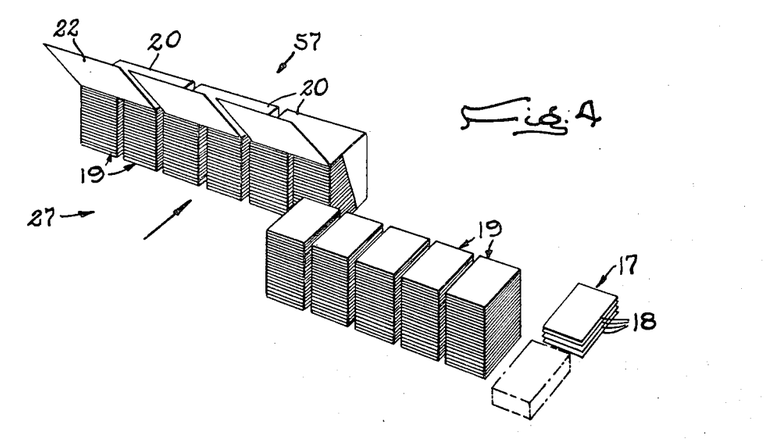
FIG. 4 is a schematic perspective view showing the packages just after one group has been inserted into the cartons.
Figure 5:
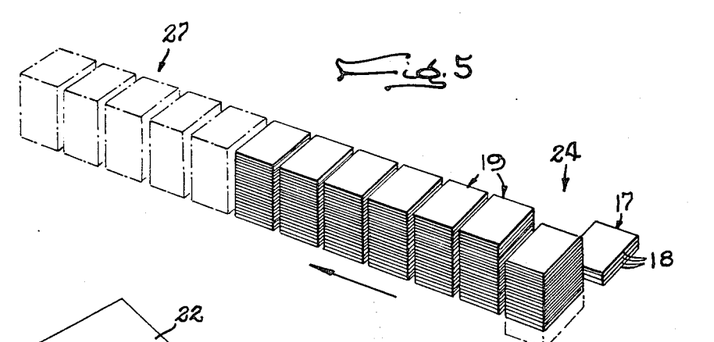
FIG. 5 is a schematic perspective view showing the next group of packages being advanced to the discharge station.
Figure 10:
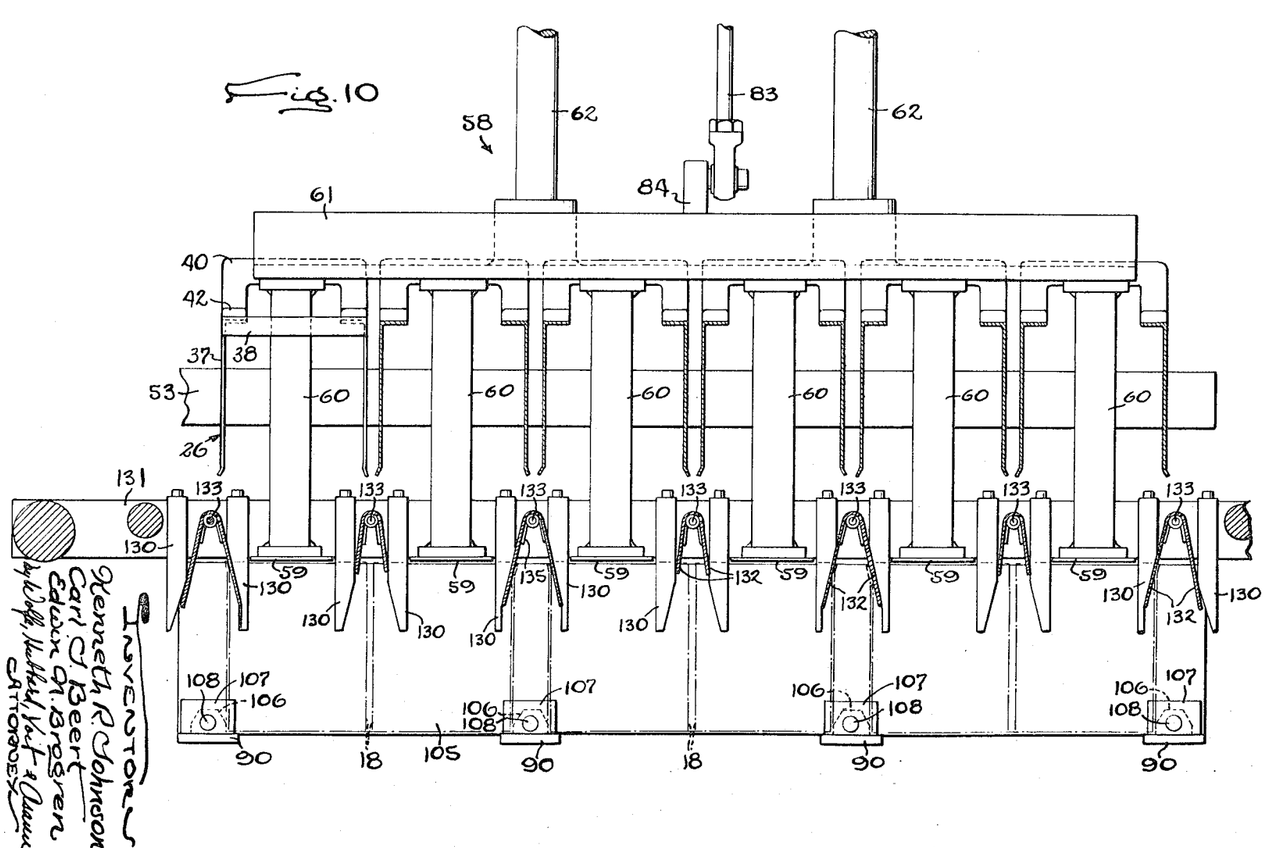
FIG. 10 is an enlarged fragmentary cross-section taken substantially along the line 10—10 of FIG. 8 and showing parts in moved positions.

As shown in FIG. 3, the empty cartons 20 are positioned side-by-side in a filling station 57 disposed alongside the discharge station 27 on the forward side of the conveyor 25, and are turned so that their open tops face the stacks 19 of pouches 18 on the conveyor. A novel loading mechanism 58 (FIGS. 8 to 10) is provided for filling all of the cartons in the filling station simultaneously, and includes a series of pushers 59 which shift in unison back and forth across the conveyor to push the stacks from the conveyor into the cartons. Preferably, three empty cartons are placed in the filling station at the same time, and the pushers are arranged in three pairs with each pair being alined with one of the cartons. Accordingly, two stacks of pouches are inserted into each of the three cartons upon a single forward stroke of the pushers.

In this instance, the pushers 59 are vertical plates secured to the forward ends of horizontal bars 60 which are fastened at their rear ends to a channel member 61 parallel to the conveyor 25. The spacing of the pushers and the bars along the channel member is correlated with the spacing of the buckets 26 along the conveyor chains 28. Extending rearwardly from the channel member are a pair of horizontal cylindrical rods 62 (FIGS. 8 to 10) each journalled for back and forth sliding in guide blocks 63 depending from opposite ends of a plate 64. The plate is secured rigidly to a frame 65 upstanding from the rear side of the base 36.

To shift the pushers 59 back and forth across the conveyor 25, the motor 43 acts through a second electro-magnetic clutch unit 66 mounted on the base 36 to drive a cam shaft 67 which is operably coupled to the pushers. For this purpose, a chain 68 (FIG. 16) extends around sprocket wheels 69 and 70 fast on the output shaft 46 of the motor and the input shaft 71 of the second clutch unit. Another drive chain 72 is trained around sprocket wheels 73 and 74 keyed to the output shaft of the clutch unit and to one end of the cam shaft, the cam shaft being journaled to turn in bearings mounted on the frame 65. Fast on the cam shaft is an eccentric cam 75 which engages a roller follower 76 (FIG. 9) journaled on a lever 77 overlying the cam shaft, the lever being fulcrumed at its right-hand end to turn about a fixed horizontal pin (not shown). At its opposite end, the lever is slidably connected to a link 78 pivotally joined at its upper end to the horizontal leg of a bell crank 79 which is mounted to turn with a shaft 80 journaled in bearings on the frame 65 for rotation about an axis paralleling the cam shaft. The crank and lever are rocked clockwise when the follower rides across a rise on the cam. To rock the crank and lever counterclockwise and to keep the follower in contact with the cam, a coil spring 80 encircles a rod 81 pivotally connected at its upper end to the horizontal crank leg and slidably received in a bracket 82 on the frame 65. The spring is compressed between the bracket and a fixed stop 82a on the rod as the crank is rocked clockwise and then extends to rock the crank and the lever counterclockwise when the follower encounters a fall surface on the cam. A horizontal link 83 extends between the upright leg of the bell crank and a tongue 84 secured to the underside of the channel member 61 to transmit motion from the bell crank to the pushers.

Figures 1, 2:
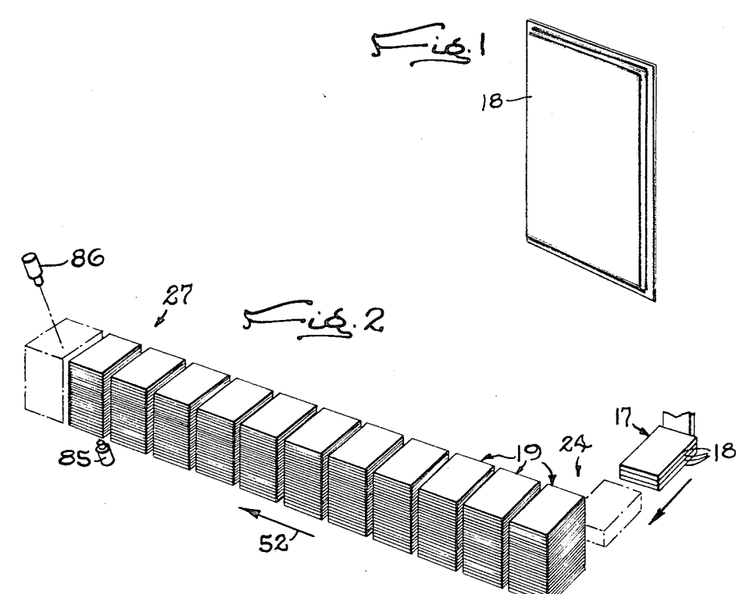
FIGURE 1 is a perspective view of a package adapted to be handled by the machine embodying the novel features of the present invention.
FIG. 2 is a schematic perspective view showing the packages as they are moved along the predetermined path to the discharge station.

The cam shaft 67 is driven in timed relation with the advance of the stacks 19 of pouches 18 along the path of the conveyor 25, and, in this instance, is turned through one revolution each time six stacks are positioned on the forward side of the pushers 59 in the discharge station 27. As shown in FIGS. 2 and 9, a light source 85 is positioned beneath the conveyor at the extreme end of the discharge station remote from the initial station 24, and directs a beam of light upwardly through a bucket 26 dwelling at the extreme end of the discharge station when that bucket is empty. A photo-electric cell 86, suspended above the conveyor from a horizontal bar 87, is alined with the light source and is electrically connected to the clutch unit 66. When the conveyor has advanced six loaded buckets into the discharge station, a stack of pouches is positioned in front of each pusher, and the stack in the bucket at the extreme end of the discharge station interrupts the light beam directed toward the photo-electric cell. Interruption of the light beam energizes the clutch unit 66 in a manner well known in the art, and the clutch remains energized until the motor 43 has turned the cam shaft 67 through one revolution. As the cam shaft starts through the one revolution, the follower 76 encounters a fall surface on the cam 75, and the spring 80 extends to rock the crank 79 and to shift the pushers forwardly across the conveyor. During the forward stroke, the six pushers first enter into the dwelling buckets (FIGS. 3, 9 and 10) between the flanges 39 and then pass through the buckets to push the stacks out of the forward sides of the buckets and into the three cartons 20 in the filling station 57. The follower then rides across a rise on the cam as the cam shaft completes the one revolution and, through the lever and the crank, shifts the pushers rearwardly back to the retracted position shown in FIG. 8. After the pushers have been retracted, the cam shaft dwells until six loaded buckets again have been advanced to the discharge station. The filled cartons are transferred to the discharge conveyor 21, and a new set of empty cartons are presented to the filling station for loading upon the next forward stroke of the pushers.

Figures 11, 12:
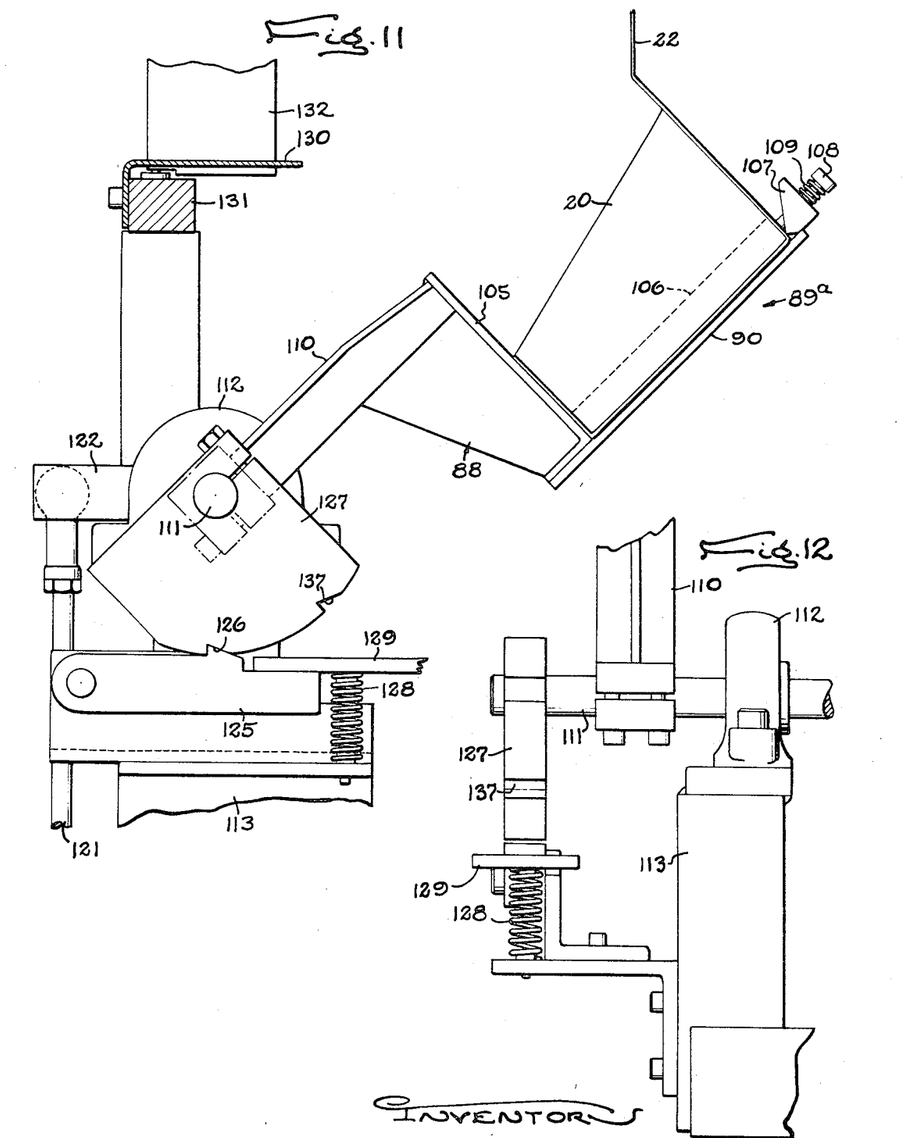
FIG. 11 is an enlarged fragmentary cross-section taken substantially along the line 11—11 of FIG. 7 and showing parts in another moved position.
FIG. 12 is a fragmentary end view of parts shown in FIG. 11.

In its primary aspect, the present invention contemplates a new and improved transfer mechanism having a carton holder 88 (FIGS. 8, 9 and 11) which receives the empty cartons 20 at a point spaced laterally from the filling station 57 and moves the cartons to the filling station with their open ends facing laterally toward the pouches 18 on the cartoning conveyor 25. After the pouches have been inserted into the cartons, the holder moves laterally away from the cartoning conveyor and loads the cartons onto the discharge conveyor 21 with their open ends facing upwardly for carriage to a terminal station. The discharge conveyor coacts with the holder in a novel manner to remove the filled cartons from the holder automatically as an incident to movement of the latter toward the conveyor.

To these ends, the holder 88 is supported for back and forth movement along an arcuate path between the filling station 57 and a transfer station 89 (FIGS. 7 and 8) spaced laterally from and below the filling station, and includes a plurality of loaders in the form of prongs 90 which support one wall of each carton 20. Cartons are placed on the holder in a loading station 89a (FIG. 11) positioned along the arcuate path between the transfer and filling stations, carried to the filling station and filled, and returned along the path through the loading station to the transfer station. The receiving end of the discharge conveyor 21 (FIGS. 7 and 14) is positioned in the transfer station, and the upper flight of the conveyor is formed with a series of flat segments 91 disposed between and above spaced upright pockets 92, the latter being alined with the prongs 90. As the holder moves into the transfer station, the prongs enter into the pockets to leave the cartons on the flat segments for transfer to the terminal station at the end of the conveyor opposite the receiving end. With this arrangement, the open ends of the cartons are turned in the filling station to face laterally toward the articles and are turned at the transfer station to face upwardly, and the filled cartons are removed from the holder, all of these operations occurring automatically as an incident to the movement of the holder along the arcuate path.

In this instance, the discharge conveyor 21 is spaced laterally from and below the cartoning conveyor 25 and comprises a flexible endless belt trained around and tensioned between relatively large parallel end rollers 95 (FIGS. 7 and 14) journaled for rotation near the ends of laterally spaced, parallel side rails 96 (FIG. 7) supported by uprights 97 positioned forwardly of the base 36. The upper flight of the conveyor is driven continuously from left to right by a belt 98 extending around a pulley 95a drivingly connected to the right roller 95 and around a sheave 99 driven by a second electric motor 99a positioned on the base 36. The left roller is slightly lower that the right roller, and the belt is trained around a small guide roller 100 journaled above the left roller thereby forming a relatively flat vertical surface 101 at the left end of the conveyor.

To form the horizontal segments 91 and the vertical pockets 92 in the upper flight of the conveyor 21, three equally spaced sets of parallel guide rollers are journaled on the side rails 96 between the end rollers 95. Each set of guide rollers comprises a lower roller 102 disposed between and below two upper rollers 103 spaced apart longitudinally of the conveyor. The upper flight runs over the left roller of each set, downwardly and under the lower roller, and then upwardly over the right roller and toward the left roller of the next set. With this arrangement, three upright pockets and three horizontal segments are formed in the upper flight of the conveyor, the number of horizontal segments thus corresponding to the number of cartons 20 which are handled at any one time.

As shown in FIGS. 7 and 8, the prongs 90 of the carton holder 88 are spaced apart in accordance with the spacing of the pockets 92 in the endless conveyor 21 and extend transversely of the conveyor when the holder is positioned in the transfer station 89. In this station, the prong at the left end of the holder lies alongside the vertical conveyor surface 101, and the remaining prongs, having a width less than the width of the pockets, are received in the pockets beneath the level of the horizontal segments 91. Herein, the prongs 90 are flat metal plates (FIGS. 11 and 15) joined at right angles to a continuous supporting wall 105 extending lengthwise of the endless conveyor. The three cartons 20 are placed in the holder with their front sides disposed in face-to-face relation with the supporting wall 105 and with their bottoms spanning the space between adjacent prongs. Thus, each end carton is supported at one bottom edge by one of the end prongs and at the opposite bottom edge by one of the center prongs (see FIG. 10), and the center carton is supported by the two center prongs. A guide rib 106 (FIGS. 11 and 15) is centered on the upper surface of each prong and extends lengthwise thereof to separate the cartons and to maintain the latter in spaced relationship in the holder. The upper portions of the ribs are formed with downwardly inclined surfaces 106a which guide the cartons onto the prongs as they are placed in the holder. At the free end of each prong, a clamping block 107 is slidably mounted on a pin 108 integral with the rib and is urged into loose clamping engagement with the back sides of adjacent cartons by a weak coil spring 109 telescoped over the pin.

To mount the carton holder 88 for back and forth movement along the arcuate path between the endless conveyor 21 and the cartoning conveyor 25, a plurality of longitudinally spaced arms 110 (FIG. 11) are secured at one end to one side of the supporting wall 105 of the carton holder and are clamped at the other end to a horizontal rock shaft 111 (FIGS. 7 and 11) which is journaled for rotation in bearings 112 mounted on a frame 113 upstanding from the base 36. The holder is moved in opposite directions along the path by an actuator 114 (FIG. 9) connected between the rock shaft and the cam shaft 67 and operable in response to rotation of the cam shaft to turn the rock shaft. Herein, the actuator comprises a roller follower 115 journaled on one leg of a pivoted bell crank 116 and engageable with a cam 117 keyed to the cam shaft. The other leg of the bell crank is connected to a long horizontal link 118 which extends across the base 36 and is slidably received in an angle bracket 119 fastened on the base. A second bell crank 120, fulcrumed to turn on the frame 113 about an axis parallel to the axis of the crank 116, joins the horizontal link 118 with the lower end of a vertical link 121 which is pivotally connected at its upper end to an arm 122 fast on the rock shaft.

When the follower 115 is engaged by a lobe 123 on the cam 117, the cranks 116 and 120 and the rock shaft 111 are turned counterclockwise, and the carton holder 88 is swung downwardly from the position alongside the cartoning conveyor 25 (FIG. 9) to the position overlying the endless conveyor 21 (FIG. 8). As the holder moves downwardly, the horizontal link 118 shifts from left to right and compresses an actuator spring 124 which is telescoped over the link between the angle bracket 119 and a collar 124a fastened on the link intermediate its ends. Accordingly, when the spring subsequently extends, the cranks and the rock shaft are turned clockwise and the holder is moved in an upward direction.

At the beginning of each cycle, the carton holder 88 is disposed at a 45-degree angle in the loading station 89a (FIG. 11) positioned along the arcuate path between the conveyors 21 and 25. When the holder is in this position, the actuator spring 124 is compressed, and the cam shaft 67 is dwelling while the stacks 19 of pouches 18 are being advanced to the discharge station 27. The compressed spring tends to rotate the holder upwardly from the loading station toward the cartoning conveyor, but is prevented from doing so by a pawl 125 (FIG. 11) which engages a notch 126 formed on a ratchet plate 127, the latter being fast on one end of the rock shaft 111. The pawl is pivotally connected to the frame 113 and is urged toward the ratchet plate by a coil spring 128 compressed between the frame and a horizontal handle 129 rigid with the free end of the pawl. With the holder thus held stationary in the loading station, the machine operator first places three empty cartons 20 side-by-side in the holder and then depresses the handle to release the pawl from the ratchet. Accordingly, the actuator spring 124 extends to rotate the holder and the cartons upwardly to the filling station 57 alongside the buckets 26 on the cartoning conveyor 25, the open ends of the cartons being turned to face the buckets as an incident to the rotation of the holder.

As the holder 88 swings into the filling station 57, the suporting wall 105 moves beneath longitudinally spaced pairs of horizontal fingers 130 (FIGS. 9 and 10) level with the platform 53 beneath the cartoning conveyor 25 and projecting forwardly from a horizontal frame bar 131. The distance between the fingers of adjacent pairs is less than the longitudinal width of the stacks 19 of pouches 18, and thus the fingers support the bottoms of the stacks as they are pushed from the cartoning conveyor into the cartons 20. Positioned above each pair of fingers is a pair of vertically disposed sheet metal wings 132 which guide the sides of the stacks as they are pushed forwardly into the cartons. As shown most clearly in FIGS. 8 to 10, each pair of wings is disposed between the fingers of each pair of fingers and is hinged on a cylindrical vertical rod 133 extending between the frame bar 131 and a parallel frame bar 134 spaced above the frame bar 131. Surrounding the hinge rod is a torsion spring 135 which urges the wings of each pair away from each other about the rod and toward the adjacent wing of the next pair, the lower edges of the wings abutting the side surfaces of the fingers 130 to limit the turning movement about the rod. As the stacks are shifted from the conveyor 25, they move between the pairs of wings and are engaged on opposite sides by adjacent wings which then yield away from each other to admit the stacks into the cartons. A downwardly and forwardly inclined continuous plate 136 (FIG. 9) is mounted on the upper frame bar 134 above the wings and serves to support the flaps 22 of the cartons when the latter are positioned in the filling station 57.

With three cartons 20 positioned in the holder 88 in the filling station 57 and with six stacks 19 of pouches 18 dwelling in the discharge station 27, the cam shaft 67 starts through one revolution, and the pushers 59 shift the stacks from the cartoning conveyor 25 toward the cartons. The stacks move between the yieldable guide wings 132 and across the projecting fingers 130 thus being accurately guided into the cartons. Then, as the cam shaft retracts the pushers, the lobe 123 on the cam 117 engages the follower 15 thereby swinging the carton holder 88 and the filled cartons downwardly toward the endless conveyor 21 and, at the same time, compressing the actuator spring 124. As the holder approaches the lowermost position, the left prong 90 (FIG. 7) moves alongside the vertical end surface 101 of the endless conveyor and the remaining prongs enter into the pockets 92 and beneath the horizontal segments 91. The cartons, having a longitudinal width greater than that of the horizontal segments, are placed in an upright position on the segments and are immediately carried along the belt to the terminal station. The cam lobe 123 passes from under the follower 115 as the prongs move below the conveyor segments, and the cam shaft 67 completes the one revolution.

During the downward movement of the holder 88, the pawl 125 rides across the notch 126 in the ratchet plate 127 and then engages a second notch 137 (FIG. 11) therein when the prongs 90 enter into the pockets 92. Thus, the pawl prevents the holder from swinging upwardly away from the conveyor 21 under the urging of the compressed actuator spring 124. With the prongs being received in the pockets, empty cartons 20 cannot be placed in the now empty holder since they immediately would be carried away on the horizontal segments 91. Therefore, the machine operator momentarily depresses the handle 129 thus releasing the pawl from the notch 137. As a consequence, the compressed spring 124 extends to swing the holder upwardly through a forty-five degree arc from the endless conveyor to the loading station 89a, the pawl subsequently entering into the notch 126 to stop the holder in that station for loading of another group of empty cartons. Thereafter, the operation is continuous with empty cartons being placed in the holder at the loading station and being carried to and filled with pouches 18 at the filling station 57. The filled cartons then are loaded onto the endless conveyor, and the empty holder is returned to the loading station to receive the next group of empty cartons.

From the foregoing, it will be apparent that the new and improved machine fills and transfers the cartons with a minimum of intervening manual operation and with relatively uncomplicated operating elements. The novel coaction between the carton holder 88 and the endless conveyor 89 not only enables the conveyor to be driven continuously, but also enables automatic removal of the cartons from the holder thus avoiding the need for a separate releasing mechanism.

We claim as our invention:

1. In a machine for loading articles into containers, the combination of, a frame, a first conveyor on said frame for supporting and advancing a series of articles to a discharge station, a power driven endless conveyor for advancing filled containers along a predetermined path from a transfer station spaced laterally and vertically from said discharge station, said endless conveyor having an upper flight defining upwardly opening pockets and a substantially flat segment between the upper ends of said pockets, a transfer device mounted on said frame and including a container holder movable in an arcuate path between said stations, said container holder having spaced prongs extending transversely of said endless conveyor and being received in said pockets below said flat segment when the holder is at said transfer station, mechanism for moving said holder in one direction along said arcuate path first from said transfer station to an intermediate position between said stations to receive empty containers, and then to said discharge station for loading of the containers with articles, a loading device mounted on said frame adjacent said discharge station and including a pusher movable between a retracted position on one side of said first conveyor and an extended position on the opposite side of the conveyor, an actuator for moving said pusher to said extended position when said holder is at said discharge station thereby to shift articles from said first conveyor into the containers along a second predetermined path, and means operable in timed relation with the movements of said pusher for thereafter moving said holder in the opposite direction along said arcuate path to said transfer station with said prongs supporting the filled containers during such movement and entering into said pockets to deposit the containers automatically on said flat segment of said endless conveyor.

2. A machine as defined in claim 1 in which the width of said pockets longitudinally of said endless conveyor is greater than the width of said prongs, and the width of said horizontal segment is less than the width of the containers.

3. A machine as defined in claim 1 further including guide wings supported on said frame and spaced laterally of said second predetermined path, means mounting said wings for movement about upright axes between first positions disposed in said second path and second positions on opposite sides of said second path, and spring means urging said wings toward said first positions, said wings engaging opposite edges of an article as the latter is shifted from said conveyor and moving to said second positions against the urging of said spring means and engaging opposite sides of the article to guide the latter into the container.

4. A machine as defined in claim 3 further including guide fingers mounted on said frame and projecting toward said holder, said guide fingers underlying said second predetermined path and supporting the lower end of an article as the latter is shifted from said conveyor into the container.

5. A machine as defined in claim 4 in which said holder has a wall projecting toward said conveyor and underlying said guide fingers when the holder is at said discharge station.

6. In a machine for loading articles into containers, the combination of, a frame, a first conveyor on said frame for supporting and advancing a series of articles to a discharge station, a second conveyor on said frame for advancing filled containers along a predetermined path from a transfer station spaced from said discharge station, said second conveyor comprising parallel rollers journaled on said frame at locations spaced longitudinally of said path, a set of guides mounted on said frame between said rollers, said guide set including first and second guides having upper surfaces disposed in a common plane, and a third guide disposed between said first and second guides below said upper surfaces, a power driven endless belt extending around and tensioned between said rollers, said belt having an uppper flight with segments thereof on opposite sides of said guide set being substantially flat, said upper flight passing over said first guide, under said third guide, and back over said second guide thereby to form an upright pocket between said segments, a transfer device mounted on said frame for movement between said stations and having a loader for supporting a container thereon, means on said frame for shifting an article on said first conveyor into an empty container on said loader when said transfer device is in said discharge station, and mechanism for thereafter moving said transfer device and the filled container to said transfer station and for shifting said loader into said pocket beneath said segments whereby the filled container is removed automatically from said loader and placed on said segments for advancement along said path by said belt.

7. A machine as defined in claim 6 having a plurality of guide sets mounted on said frame at longitudinally spaced points thereby to form an alternating series of upright pockets and flat segments in the upper flight of said belt.

8. A machine as defined in claim 7 in which said transfer device includes a series of loaders movable between said stations, said loaders extending transversely of said belt and being received in said pockets when in said transfer station.

9. A machine as defined in claim 6 further including an additional guide spaced vertically from one of said rollers, said belt extending around said additional guide thereby to form a flat surface at the end of said belt adjacent said one roller, and an additional loader on said transfer device spaced longitudinally from said one loader, said additional loader being positioned alongside said flat surface when said one loader is in said pocket.

References Cited

UNITED STATES PATENTS

| | | | |
|---|---|---|---|
| 1,935,249 | 11/1933 | Mott | 53—164 |
| 2,934,869 | 5/1960 | Engleson et al. | 53—252 X |
| 2,941,339 | 6/1960 | Salwasser | 53—26 |
| 3,139,714 | 7/1964 | Hall | 53—159 |
| 3,323,283 | 6/1967 | Johnson et al. | 53—186 |

TRAVIS S. McGEHEE, *Primary Examiner.*

N. ABRAMS, *Assistant Examiner.*